United States Patent
Bauer et al.

[11] Patent Number: 5,863,009
[45] Date of Patent: Jan. 26, 1999

[54] APPARATUS FOR PRETENSIONING SEAT BELT WEBBING

[75] Inventors: Barney J. Bauer, Fenton; Arnold J Herberg, Davisburg, both of Mich.

[73] Assignee: TRW Vehicle Safety Systems Inc., Lyndhurst, Ohio

[21] Appl. No.: 998,241

[22] Filed: Dec. 24, 1997

[51] Int. Cl.$^6$ ................................................. B60R 22/46
[52] U.S. Cl. ............................................................ 242/374
[58] Field of Search ........................ 242/374; 280/801.1, 280/805, 806

[56] References Cited

U.S. PATENT DOCUMENTS

| | | | |
|---|---|---|---|
| 3,937,487 | 2/1976 | Pech | 280/805 |
| 4,152,025 | 5/1979 | Bendler, et al. | 280/805 |
| 5,407,148 | 4/1995 | Ono et al. | |
| 5,671,949 | 9/1997 | Bauer, et al. | 280/806 |

FOREIGN PATENT DOCUMENTS 32 20 498 A1  12/1983  Germany .

6-270762  9/1994  Japan ..................................... 280/806

*Primary Examiner*—John P. Darling
*Attorney, Agent, or Firm*—Tarolli, Sundheim, Covell, Tummino & Szabo

[57] ABSTRACT

An apparatus (40) pretensions seat belt webbing (16) which is extensible about an occupant of a vehicle seat (14). The apparatus (40) includes a housing (50) defining a chamber (56), a piston (90) in the chamber (56), and a coupling member (42) for coupling the piston (90) to the seat belt webbing (16). The coupling member (42) transmits force acting on the piston (90) to the seat belt webbing (16). The apparatus (40) further includes a first pyrotechnic device (200) for applying a first force to the piston (90) to move the piston initially in a first direction (B) in the chamber (56) to remove slack in the seat belt webbing (16). A second pyrotechnic device (220) applies a second force to the piston (90) in the first direction (B) to tension the seat belt webbing (16) against the occupant after the slack has been removed from the seat belt webbing (16) by the first force.

17 Claims, 5 Drawing Sheets

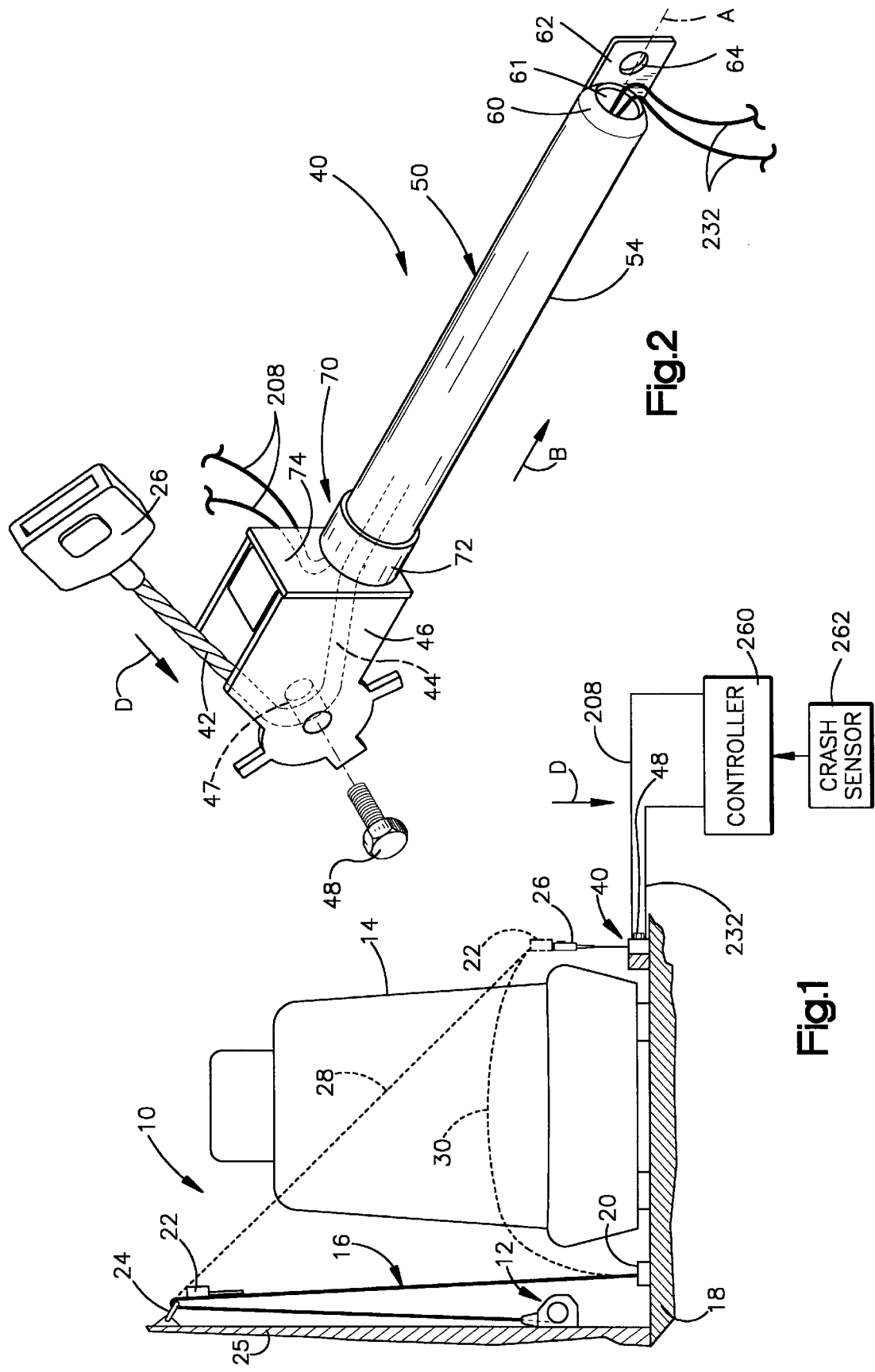

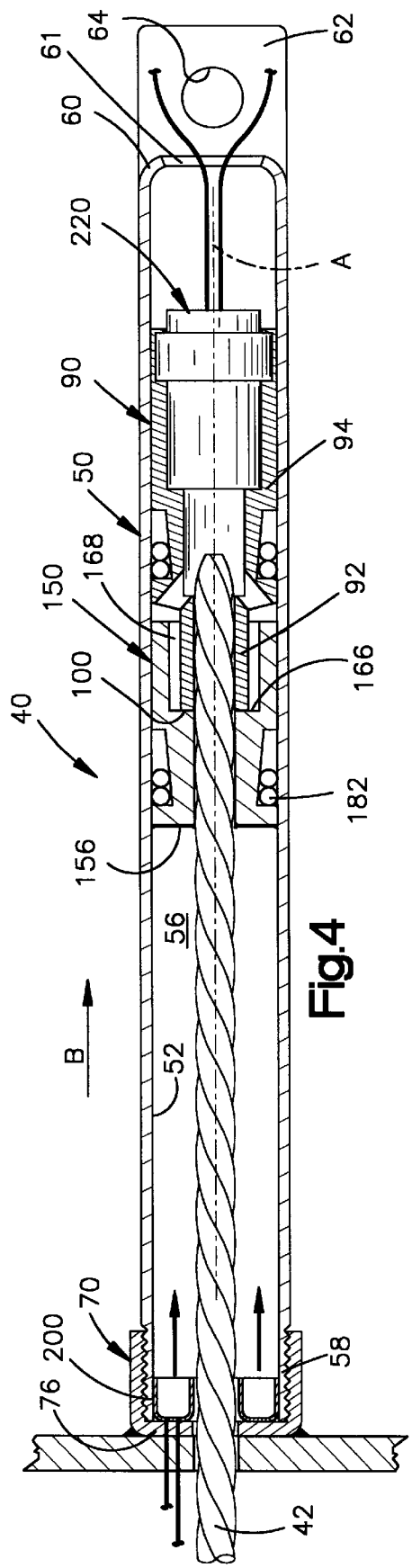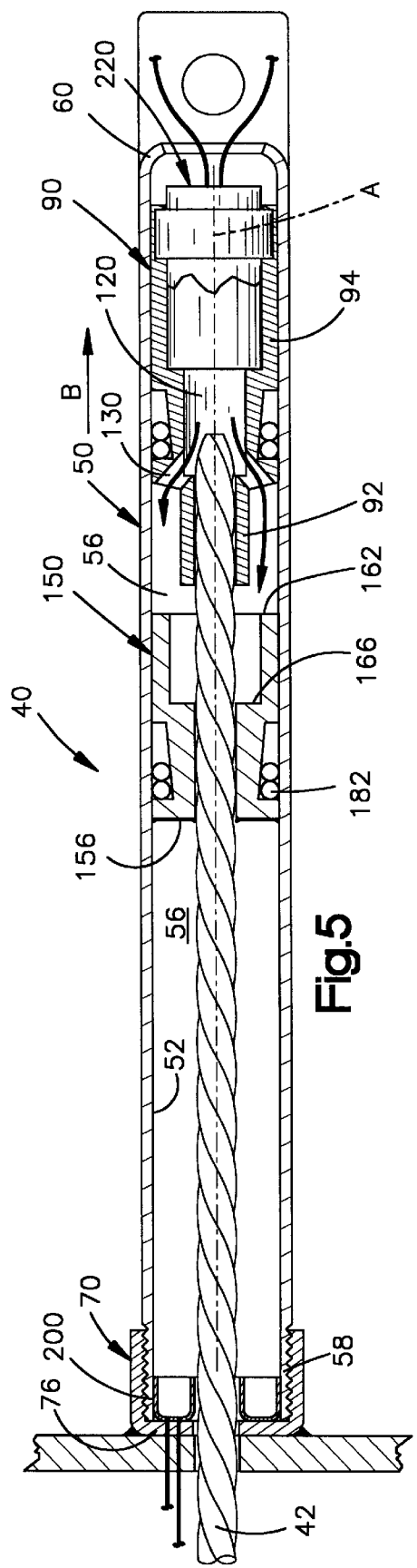

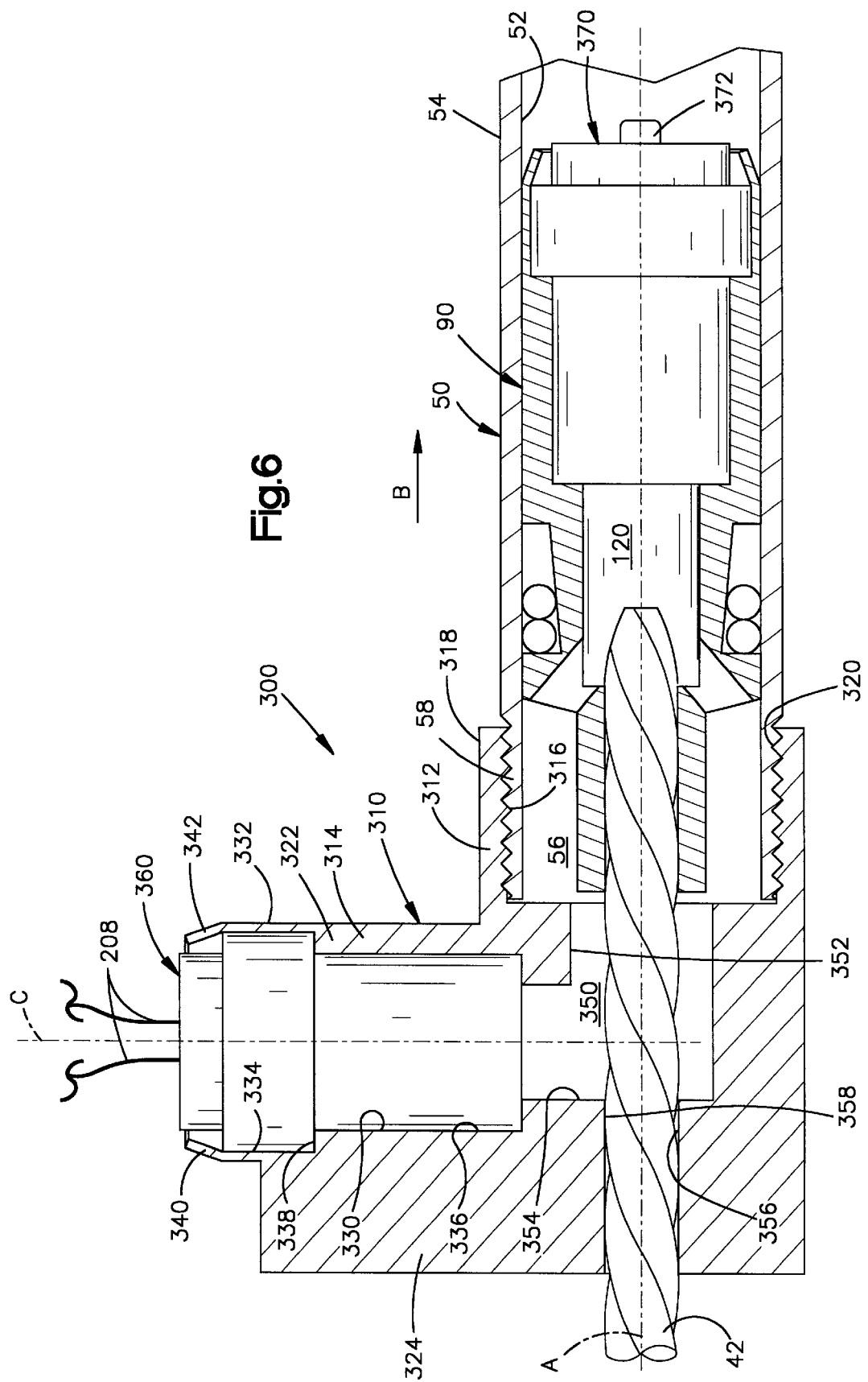

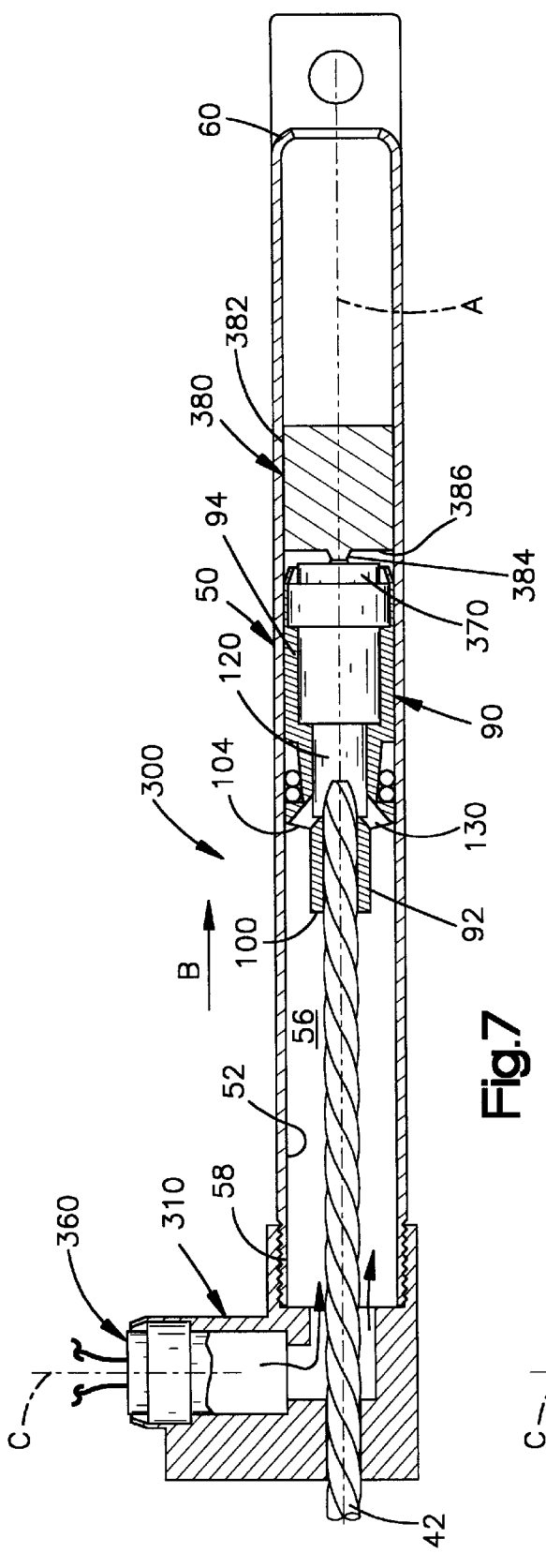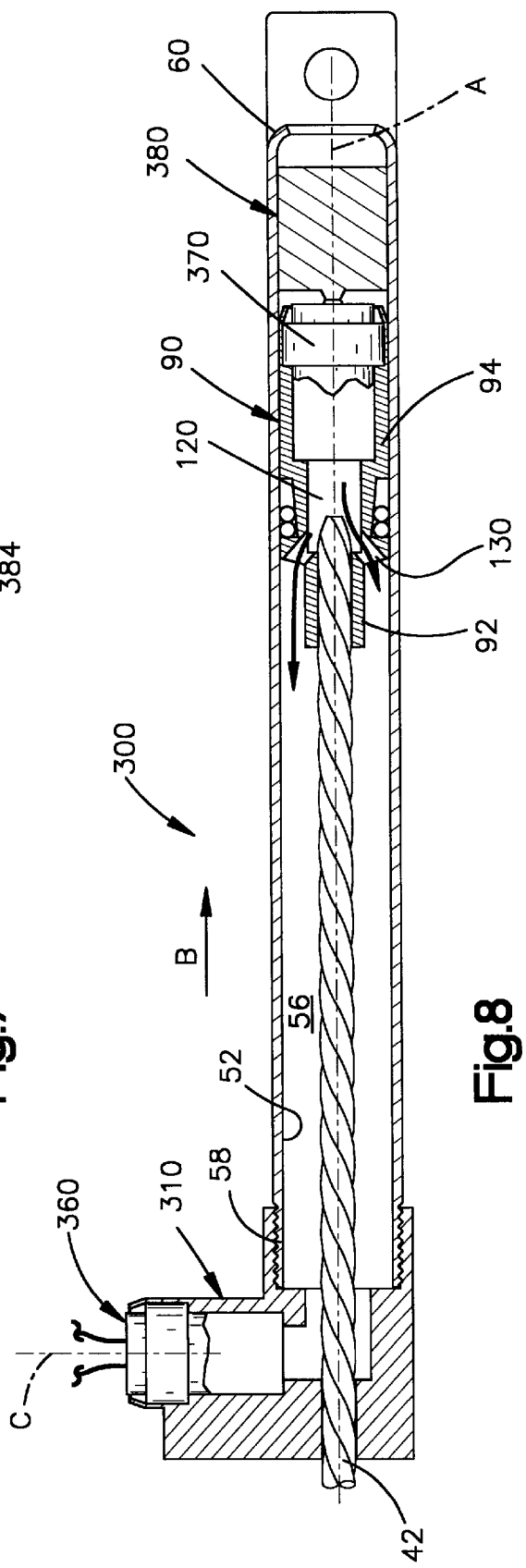

APPARATUS FOR PRETENSIONING SEAT BELT WEBBING

BACKGROUND OF THE INVENTION

1. Technical Field

The present invention relates to an apparatus for pretensioning seat belt webbing which is extensible about an occupant of a vehicle seat.

2. Description of the Prior Art

It is known to pretension seat belt webbing in the event of a vehicle collision. In one known seat belt webbing system, the seat belt webbing is pretensioned by moving a buckle associated with the seat belt webbing through a pretensioning stroke. The pretensioning stroke is accomplished by actuating a pyrotechnic charge in a piston/cylinder device.

It is characteristic of the known pretensioning devices that the final pretensioning force which is applied to the occupant (through tension in the seat belt webbing) is dependent on the amount of slack in the seat belt webbing which is removed during the pretensioning stroke. The amount of slack in the seat belt webbing varies with the size and shape of the occupant of the seat as well as with the type of clothing worn by the occupant and the design of the vehicle seat. Due to an inherently fast pressure drop in the pretensioner cylinder after actuation of the pyrotechnic charge and the variation in the amount of slack in the webbing, the amount of pretensioning force can vary for occupants of different sizes and shapes.

SUMMARY OF THE INVENTION

The present invention is an apparatus for pretensioning seat belt webbing which is extensible about an occupant of a vehicle seat. The apparatus comprises a housing defining a chamber, a first piston in the chamber, and coupling means for coupling the first piston to the seat belt webbing. The coupling means transmits force acting on the first piston to the seat belt webbing. The apparatus also comprises first means for applying a first force to the first piston to move the first piston initially in a first direction in the chamber to remove slack in the seat belt webbing. The apparatus further comprises second means for applying a second force to the first piston in the first direction to tension the seat belt webbing against the occupant after the slack has been removed from the seat belt webbing by the first force.

In accordance with a first embodiment of the invention, the first means comprises a second piston in the chamber and abutting the first piston. The first means also comprises a first pyrotechnic device for increasing the pressure in said chamber acting on the second piston to effect movement of the first and second pistons in the chamber.

Also in accordance with the first embodiment, the second means comprises a second pyrotechnic device for increasing the pressure in the chamber acting on the first piston in the first direction. The second pyrotechnic device has a larger output than the first pyrotechnic device.

In accordance with a second embodiment of the invention, the first means comprises a first pyrotechnic device connected with the housing and the second means comprises a second pyrotechnic device connected with the first piston.

Also in accordance with the second embodiment, the apparatus comprises a contact block in the cylinder. The second pyrotechnic device is actuated by contacting the contact block. The second pyrotechnic device is moved into contact with the contact block by the first force applied to the first piston.

BRIEF DESCRIPTION OF THE DRAWINGS

Further features of the present invention will become apparent to one skilled in the art to which the present invention relates from reading the following specification with reference to the accompanying drawings, in which:

FIG. 1 is a schematic illustration of a vehicle seat belt system including an apparatus for pretensioning seat belt webbing constructed in accordance with the present invention;

FIG. 2 is a perspective view of a portion of the pretensioner apparatus of FIG. 1;

FIG. 4 is a view similar to FIG. 3 showing the pretensioner apparatus in a partially actuated condition;

FIG. 5 is a view similar to FIG. 4 showing the pretensioner apparatus in a fully actuated condition;

FIG. 6 is an enlarged sectional view of a pretensioner apparatus constructed in accordance with a second embodiment of the present invention, the pretensioner apparatus being shown in an unactuated condition;

FIG. 7 is a view similar to FIG. 6 showing the pretensioner apparatus of FIG. 6 in a partially actuated condition; and FIG. 8 is a view similar to FIG. 7 showing the pretensioner apparatus of FIG. 6 in a fully actuated condition.

DESCRIPTION OF PREFERRED EMBODIMENTS

Figure 3:
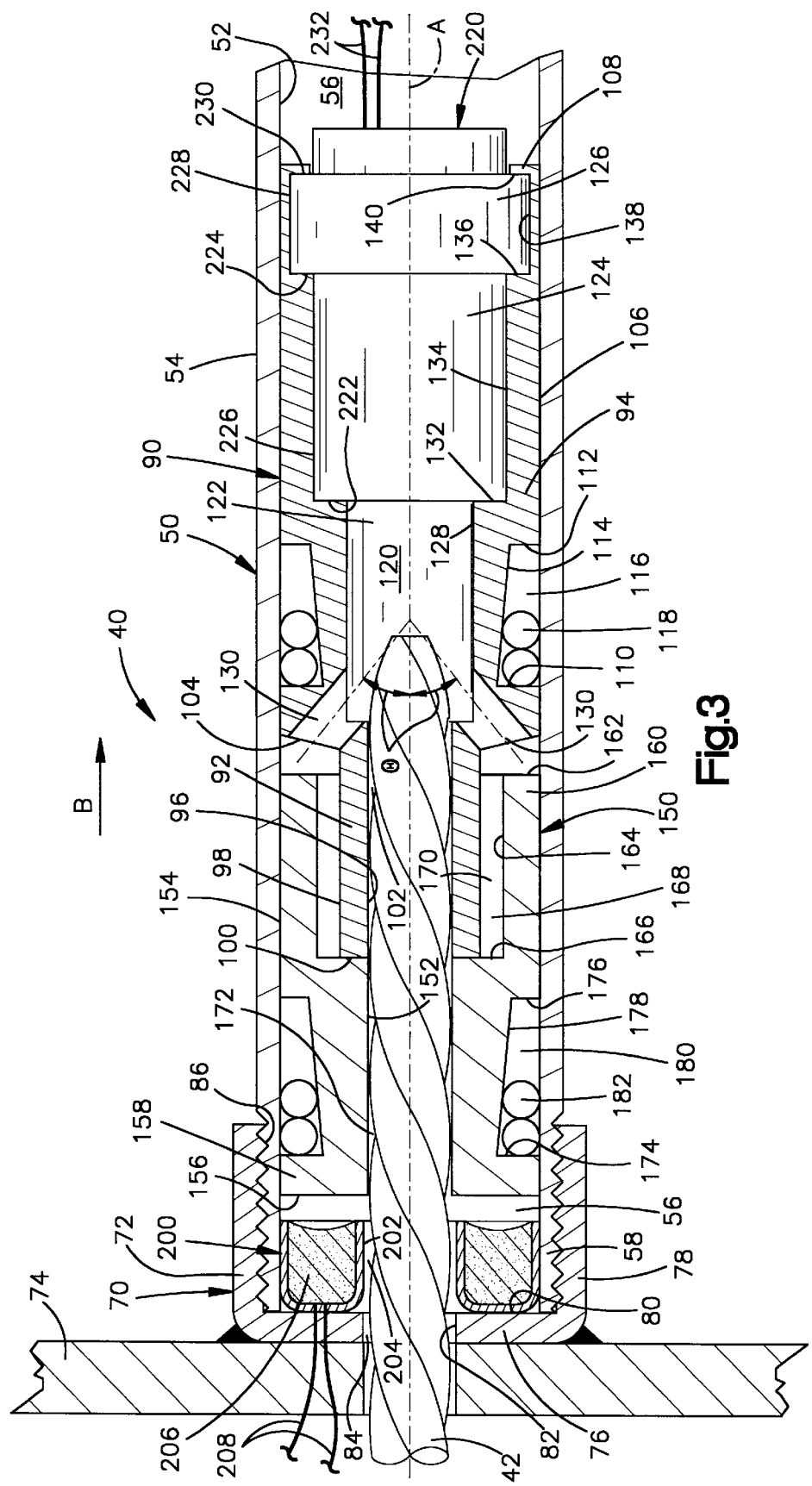
FIG. 3 is an enlarged sectional view of a portion of the pretensioner apparatus of FIG. 2 in an unactuated condition.

The present invention relates to an apparatus for pretensioning seat belt webbing which is extensible about an occupant of a vehicle seat. The present invention is applicable to seat belt systems of various constructions. As representative of the present invention, FIG. 1 illustrates a three-point continuous loop seat belt system 10 for use in restraining an occupant of a vehicle.

The occupant of the vehicle sits on a vehicle seat 14 which is illustrated as a front passenger seat in the vehicle. A length of seat belt webbing 16 is extensible about the vehicle occupant. One end of the length of belt webbing 16 is anchored to the vehicle body 18 at an anchor point 20 located on one side of the seat 14. The opposite end of the belt webbing 16 is attached to a retractor 12 which is secured to the vehicle body 18 on the same side of the seat 14. Intermediate its ends, the belt webbing 16 passes through a tongue assembly 22 and a D-ring 24 that is mounted to a B-pillar 25 above the retractor 12 and the anchor point 20. When the seat belt system 10 is not in use, the belt webbing 16 is wound on the retractor 12 and is oriented generally vertically on the one side of the seat 14, as shown in solid lines in FIG. 1.

To engage the seat belt system 10, the tongue assembly 22 is manually grasped and is pulled across the lap and torso of the occupant sitting in the seat 14. As the tongue assembly 22 is pulled across the lap and torso of the occupant, the tongue assembly moves along the belt webbing 16, and the belt webbing is unwound from the retractor 12. When the belt webbing 16 has been pulled across the lap and torso of the occupant, the tongue assembly 22 is connected with a buckle 26, as shown in dashed lines in FIG. 1. The buckle 26 is connected to the vehicle body 18 and is disposed on the side of the seat 14 opposite the anchor point 20. When the seat belt system 10 is thus buckled, the length of belt webbing 16 is divided by the tongue assembly 22 into a torso portion 28 which extends across the torso of the occupant and a lap portion 30 which extends across the lap of the occupant.

The seat belt system 10 includes pretensioner apparatus 40 which is operable to remove slack from the seat belt webbing 16 and to tension the seat belt webbing in the event of sudden vehicle deceleration such as occurs in a vehicle collision. The pretensioner apparatus 40 (FIG. 2) includes a cable 42, one end of which is fixedly connected to the seat belt buckle 26. A middle portion 44 of the cable 42 extends through an anchor bracket 46 and slidingly engages a cylindrical spacer 47 in the anchor bracket. The anchor bracket 46 is secured to the vehicle body 18 by a bolt 48 which extends through the cylindrical spacer 47.

The pretensioner apparatus 40 includes a cylindrical housing 50 and an end cap 70. The housing 50 is centered in an axis A and has parallel inner and outer surfaces 52 and 54, respectively (FIG. 3). The inner surface 52 defines a cylindrical chamber 56 in the housing 50. The housing 50 includes a first end portion 58 and a second end portion 60 having an open end 61 (FIGS. 2 and 4). The outer surface 54 of the housing 50 at the first end portion 58 is threaded.

A planar mounting flange 62 extends from the second end portion 60 of the housing 50. The mounting flange 62 has a centrally located opening 64 for receiving a bolt (not shown) to secure the housing 50 to the vehicle body 18. The housing 50 is shown oriented horizontally in FIG. 1, but the housing could be oriented vertically or at an angle between horizontal and vertical.

The end cap 70 includes a main body portion 72 and a radially extending flange portion 74 welded to the main body portion. The flange portion 74 is secured to the mounting bracket 46 by fasteners (not shown). The main body portion 72 of the end cap 70 is centered on the axis A and includes a radially extending first portion 72 and an axially extending second portion 78 (FIG. 3). The first portion 76 has an inwardly facing, radially extending first surface 80. An axially extending second surface 82 extends through the main body portion 72 and the flange portion 74 of the end cap 70. The second surface 82 defines an opening 84 which is centered on the axis A. A portion of the cable 42 extends through the opening 84 in the end cap 70. An axially extending third surface 86 of the end cap 70 is located inside the second portion 78 of the main body portion 72 of the end cap. The third surface 86 is threaded to match the threads on the outer surface 54 of the first end portion 58 of the housing 50.

The pretensioner apparatus 40 further includes first and second pistons 90 and 150, respectively, in the chamber 56 in the housing 50. The first piston 90 is annular in shape and is centered on the axis A. The first piston 90 has first and second portions 92 and 94, respectively. The first portion 92 of the first piston 90 has parallel inner and outer surfaces 96 and 98, respectively. A radially extending end surface 100 of the first portion 92 interconnects the inner and outer surfaces 96 and 98. The inner surface 96 defines a passage 102 centered on axis A and which extends through the first portion 92 of the first piston 90. A portion of the cable 42 extends through the passage 102 in the first piston 90 and is connected to the first piston in a known manner (not shown).

An oblique surface 104 extends between the first portion 92 of the first piston 90 and the second portion 94 of the first piston. The second portion 94 of the first piston 90 has a cylindrical outer surface 106 which slidingly engages the inner surface 52 of the housing 50. A crimpable flange 108 is located at a terminal end of the second portion 94 opposite the oblique surface 104.

First and second surfaces 110 and 112, respectively, in the second portion 94 of the first piston 90 extend parallel to one another and radially inward from the outer surface 106. The first and second surfaces 110 and 112 are connected by a frustoconical third surface 114 as is illustrated in FIGS. 3–5. The first surface 110, the second surface 112, and the third surface 114 together define an annular groove 116 in the second portion 94 of the first piston 90. Anti-pullback lock balls 118 are disposed in the annular groove 116 for permitting movement of the first piston 90 in a direction indicated by arrow B (to the right as viewed in FIGS. 3–5) and for preventing movement of the piston in an opposite direction (to the left as viewed in FIGS. 3–5).

The second portion 94 of the first piston 90 includes a fluid chamber 120 which is divided into a first section 122, a second section 124, and a third section 126. The first section 122 of the fluid chamber 120 is primarily defined by an axially extending first surface 128. The first section 122 is in fluid communication with the passage 102 in the first portion 92 of the first piston 90. Multiple circumferentially spaced gas outlet openings 130 extend from the first section 122 of the chamber 120 to the oblique surface 104 at an angle 0 from the axis A.

The second section 124 of the fluid chamber 120 is defined by a radially extending second surface 132 and an axially extending third surface 134. The second surface 132 connects the first surface 128 to the third surface 134.

The third section 126 of the chamber 120 is defined by a radially extending fourth surface 136 and an axially extending fifth surface 138. The fourth surface 136 connects the third surface 134 to the fifth surface 138. A portion of the fifth surface 138 forms an inner surface 140 of the crimpable flange 108.

The second piston 150 is annular in shape and is centered on the axis A. The second piston 150 is located between the first end portion 58 of the housing 50 and the first piston 90. The second piston 150 has parallel inner and outer surfaces 152 and 154, respectively. A radially extending first surface 156 extends between the inner and outer surfaces 152 and 154 at a first end 158 of the second piston 150. At a second end 160 of the second piston 150, a radially extending second surface 162 extends from the outer surface 154 to an axially extending third surface 164. The axially extending third surface 164 is connected to the inner surface 152 of the second piston 150 by a radially extending fourth surface 166. The third and fourth surfaces 164 and 166 together define a cylindrical cavity 168 in the second piston 150.

The first end portion 92 of the first piston 90 is normally located inside the cavity 168 in the second piston. The end surface 100 of the first piston 90 abuts the radially extending fourth surface 166 in the cavity 168 in the second piston 150. As may be seen in FIGS. 3–5, a radial gap 170 exists between the outer surface 98 of the first portion 92 of the first piston 90 and the third surface 164 in the cavity 168 in the second piston 150.

The inner surface 152 of the second piston 150 defines a passage 172 through the second piston 150. The passage 172 extends from the first surface 156 of the second piston 150 to the cavity 168 in the piston. The passage 172 is centered on the axis A and has a diameter which is approximately equal to the diameter of the passage 102 in the first portion 92 of the first piston 90. A portion of the cable 42 extends through the passage 172 in the second piston 150.

The second piston 150 further includes parallel fifth and sixth surfaces 174 and 176 which extend radially inward from the outer surface 154 of the second piston. The fifth and sixth surfaces 174 and 176 are connected by a frustoconical seventh surface 178 as shown in FIGS. 3–5. The fifth surface 174, the sixth surface 176, and the seventh surface 178 together define an annular groove 180 in the second piston 150. Anti-pullback lock balls 182 are disposed in the annular groove 180 for permitting movement of the second piston 150 in the direction of arrow B (to the right as viewed in FIGS. 3–5) and for preventing movement in the opposite direction (to the left as viewed in FIGS. 3–5).

The pretensioner apparatus 40 includes first and second pyrotechnic devices 200 and 220, respectively. The first pyrotechnic device 200 is annular in shape and is centered on the axis A. The first pyrotechnic device 200 is secured in the chamber 56 in the housing 50 between the radially extending first portion 76 of the main body portion 72 of the end cap 70 and the first end 158 of the second piston 150. The first pyrotechnic device 200 includes a cylindrical inner surface 202 which defines a central passage 204 through the device. The central passage 204 is centered on the axis A and has a diameter which is approximately equal to the diameter of the passage 102 in the first portion 92 of the first piston 90 and the diameter of the passage 172 in the second piston 150.

The first pyrotechnic device 200 includes a material 206 which, when actuated by a flow of electric current, ignites and combusts to increase the pressure in the chamber 56. The first pyrotechnic device 200 is electrically actuatable over lead wires 208 which extend out of the chamber 56 in the housing 50 through an opening (not shown) in the first portion 76 of the main body portion 72 of the end cap 70.

The second pyrotechnic device 220 occupies the second and third sections 124 and 126 of the fluid chamber 120 in the second portion 94 of the first piston 90. The second pyrotechnic device 220 includes radially extending first and second surfaces 222 and 224, respectively, which abut the radially extending second and fourth surfaces 132 and 136, respectively, in the fluid chamber 120 of the first piston 90. Axially extending third and fourth surfaces 226 and 228, respectively, of the second pyrotechnic device 220 abut the axially extending third and fifth surfaces 134 and 138, respectively, in the chamber 120 in the piston 90. The crimpable flange 108 of the first piston 90 crimps over a radially extending fifth surface 230 of the second pyrotechnic device 220 to secure the device in the chamber 120 in the first piston.

The second pyrotechnic device 220 includes a material which, when actuated by a flow of electric current, ignites and combusts to increase the pressure in the chamber 56 in the housing 50. The pyrotechnic device 220 is electrically actuatable over lead wires 232 which extend out of the chamber 56 in the housing 50 through the open end 61 in the second end portion 60. In accordance with a preferred embodiment of the present invention, the second pyrotechnic device 220 has a larger output than the first pyrotechnic device 200. However, it is contemplated that the second pyrotechnic device 220 could have a slightly smaller output than the first pyrotechnic device 200 for certain applications of the present invention.

The pretensioner apparatus 40 includes a system controller 260 mounted in the vehicle (FIG. 1). The system controller 260 is electrically connected to the first and second pyrotechnic devices 200 and 220 by the lead wires 208 and 232, respectively. The system controller 260 preferably comprises a microcomputer or microprocessor. A crash sensor 262 mounted on the vehicle body 18 is also electrically connected to the system controller 260. The crash sensor 262 senses one or more conditions indicative of a vehicle collision, such as sudden vehicle deceleration.

The second piston 150 of the pretensioner apparatus 40 is movable between first and second positions in the chamber 56 in the housing 50. The first position for the second piston 150 is near the first end portion 58 of the housing 50. The second position for the second piston 150 is intermediate the first and second end portions 58 and 60, respectively, of the housing 50.

The first piston 90 of the pretensioner apparatus 40 is movable between third, fourth and fifth positions in the chamber 56 in the housing 50. In the third position, the first piston 90 is adjacent the second piston 150 when the second piston is in the first position. In the fourth position, the first piston 90 is adjacent the second piston 150 when the second piston is in the second position. The first piston 90 in the fifth position is near the second end portion 60 of the housing 50 and is spaced from the second piston 150.

Under normal driving conditions, the seat belt buckle 26 and the cable 42 are in the positions shown in FIG. 2. The cable 42 interconnecting the first piston 90 and the seat belt buckle 26 is taut.

Further, under normal conditions, the second piston 150 is in the first position in the chamber 56 near the first end portion 58 of the housing 50 (FIG. 3). The first piston 90 is in the third position in the chamber 56 adjacent the second piston 150 when the second piston 150 is in the first position. In the third position, the second piston 150 is axially between the first pyrotechnic device 200 and the second portion 94 of the first piston 90. The first portion 92 of the first piston 90 extends into the cavity 168 in the second piston 150.

In the event of sudden vehicle deceleration such as occurs in a collision, the crash sensor 262 sends a collision detection signal to the system controller 260. The first pyrotechnic device 200 is actuated by an electric signal from the system controller 260 over the lead wires 208.

When the first pyrotechnic device 200 is actuated, the resulting combustion products of the pyrotechnic device rapidly produce a significant increase in pressure inside the chamber 56 in the housing 50. The increased fluid pressure in the chamber 56 applies force against the first surface 156 of the second piston 150 and causes the second piston to move in the direction of arrow B. Because the end surface 100 of the first portion 92 of the first piston 90 is in contact with the fourth surface 166 in the cavity 168 of the second piston 150, the first piston 90 is also moved by the force applied against the second piston.

Under the force generated by the first pyrotechnic device 200, the first and second pistons 90 and 150 are moved from the respective third and first positions shown in FIG. 3 toward the respective fourth and second positions illustrated in FIG. 4.

As the first piston 90 moves to the fourth position in the housing 50, the cable 42 is pulled along with the piston. This pulling of the cable 42 causes the seat belt buckle 26, to which one end of the cable is connected, to be pulled generally downward in a direction indicated by arrow D (see FIGS. 1 and 2). The generally downward movement of the seat belt buckle 26 pulls the tongue assembly 22 downward, thereby removing any slack in the seat belt webbing 16. The force which results from the actuation of the first pyrotechnic device 200, referred to as "the slack-removing force", is preferably in the range of 250–700N of belt webbing tension.

In the preferred embodiment, approximately 2–3 milliseconds after the first pyrotechnic device 200 is actuated, the system controller 260 actuates the second pyrotechnic device 220. The time difference between actuation of the first and second pyrotechnic device 200 and 220 may vary based upon the requirements of a specific seat belt pretensioning system. When the second pyrotechnic device 220 is actuated, the resulting combustion products of the pyrotechnic device rapidly produce a significant increase in pressure inside the fluid chamber 120 in the second portion 94 of the first piston 90. The increased fluid pressure in the chamber 120 passes through the plurality of gas outlet openings 130 and applies force against the second end surface 162 and the fourth surface 166 of the second piston 150. Because the anti-pullback lock balls 182 prevent the second piston 150 from moving to the left (as viewed in FIG. 4), the force of the pressure between the first and second pistons 90 and 150 causes the first piston 90 to move in the direction of arrow B. The first piston 90 moves toward the fifth position adjacent the second end portion 60 of the housing 50 while the second piston 150 remains stationary. Thus, in the fifth position, the first piston 90 is axially spaced from the second piston 150 because the first piston has moved relative to the second piston.

As the first piston 90 moves to the fifth position in the housing 50, the cable 42 is pulled along with the piston. This pulling of the cable 42 causes the seat belt buckle 26 to be pulled farther generally downward in the direction indicated by the arrow D. This additional generally downward movement of the seat belt buckle 26 pulls the tongue assembly 22 farther downward, thereby tensioning the seat belt webbing 16. The larger force which results from the actuation of the (larger output) second pyrotechnic device 220, referred to as "the pretensioning force", is selected to match the requirement of a specific system but typically does not exceed 2.5KN of webbing tension in the shoulder area of the vehicle occupant.

The pretensioner apparatus 40 described above provides a pretensioning force which is constant for all occupants. Regardless of the size and shape of a particular vehicle seat occupant, the slack-removing force takes up slack in the belt webbing 16 without reducing the amount of the pretensioning force available for tensioning the belt webbing. The second piston 150, which is moved to the second position in the housing 50 by the slack-removing force generating by the first pyrotechnic device 200, functions as a base for the tensioning movement of the first piston 90. Since the first piston 90 is in a position adjacent to the second piston 150 when the second pyrotechnic device 220 is actuated, the first piston 90 will exert about the same pretensioning force on the occupant through tension in the seat belt webbing 16 regardless of the size and shape of the occupant.

FIGS. 6–8 illustrate a pretensioner apparatus 30 in accordance with a second embodiment of the present invention. In FIGS. 6–8, reference numbers identical to those of the embodiment of FIGS. 1–5 are used to designate parts which are identical to the parts of the embodiment of FIGS. 1–5.

The pretensioner apparatus 300 includes a cylindrical housing 50 and an end cap 310 having an L-shaped cross-section. The end cap 310 has first and second portions 312 and 314, respectively, which are perpendicular to one another. The first portion 312 of the end cap 310 is cylindrical and is centered on the axis A. The first portion 312 has parallel inner and outer surfaces 316 and 318, respectively. A first surface portion 320 of the inner surface 316 is threaded to match the threads on the outer surface 54 of the first end portion 58 of the housing 50.

The second portion 314 of the end cap 310 has a cylindrical main body portion 322 and a planar mounting flange portion 324 welded to the main body portion. The mounting flange portion 324 is secured to the mounting bracket 46 by fasteners (not shown). The main body portion 322 of the end cap 310 is centered on an axis C and has inner and outer surfaces 330 and 332, respectively. The inner surface 330 includes an axially extending first surface portion 334 and an axially extending second portion 336 connected by a radially extending third surface portion 338. A terminal end portion 340 of the second portion 314 of the end cap 310 forms a crimpable flange 342.

An L-shaped combustion chamber 350 is formed in the end cap 310. The L-shaped combustion chamber 350 is defined by a first annular surface 352 in the first portion 312 of the end cap 310 which is parallel to the axis A and which intersects a second annular surface 354 in the second portion 314 of the end cap. The second annular surface 354 is parallel to the axis C.

The end cap 310 further includes an axial passage 356 centered on the axis A and defined by a third annular surface 358. The axial passage 356 is in fluid communication with the combustion chamber 350 in the end cap 310. As may be seen in FIGS. 6–8, the cable 42 passes through the passage 356 and the combustion chamber 350.

The pretensioner apparatus 300 includes a first pyrotechnic device 360 located in the second portion 314 of the end cap 310. The first pyrotechnic device 360 is identical in configuration to the second pyrotechnic device 220 described in the first embodiment. The first pyrotechnic device 360 is secured to the end cap 310 by the crimpable flange 342.

The pretensioner apparatus 300 further includes a piston 90 and a second pyrotechnic device 370 mounted in the piston. The piston 90 and the second pyrotechnic device 370 are identical in configuration to the first piston 90 and the second pyrotechnic device 220 described in the first embodiment, except that the pyrotechnic device 370 has a mechanical firing pin 372 and is actuated mechanically rather than electrically. The first and second pyrotechnic devices 360 and 370 are equal in output capacity.

A contact block 380 is located in the housing 50 of the pretensioner apparatus 300 (FIG. 7). The contact block 380 is centered on the axis A and is located intermediate the first and second end portions 58 and 60 of the housing 50. The contact block 380 has an annular outer surface 382 which is slightly larger in diameter than the inner surface 52 of the housing 50 and thus frictionally engages the inner surface. An axial projection 384 extends from an end surface 386 of the contact block 380 facing toward the piston 90. The projection 384 is axially aligned with the firing pin 372 of the second pyrotechnic device 370.

The piston 90 in the pretensioner apparatus 300 is movable between first, second and third positions in the chamber 56 in the housing 50. The first position of the piston 90 is adjacent the first end portion 58 of the housing. The second position of the piston 90 is intermediate the first and second end portions 58 and 60, respectively, of the housing 50. The piston 90 in the third position is adjacent the second end portion 60 of the housing 50.

The contact block 380 in the pretensioner apparatus 300 is movable between fourth and fifth positions in the chamber 56 in the housing 50. In the fourth position, the contact block 380 is intermediate the first and second end portions 58 and 60, respectively, of the housing 50. In the fifth position, the contact block 380 is adjacent the piston 90 when the piston is in the third position.

Under normal conditions, the piston 90 is in the first position in the chamber 56 adjacent the first end portion 58 of the housing 50 as shown in FIG. 6. The contact block 380 is frictionally held in the fourth position in the chamber 56 illustrated in FIG. 7.

In the event of sudden vehicle deceleration such as occurs in a collision, the crash sensor 262 sends a collision detection signal to the system controller 260. The first pyrotechnic device 360 is actuated by an electric signal from the system controller 260 over the lead wires 208.

When the first pyrotechnic device 320 is actuated, the resulting combustion products of the pyrotechnic device rapidly produce a significant increase in pressure inside the chamber 350 in the end cap 310 and the chamber 56 in the housing 50. The increased fluid pressure in the chamber 56 applies force against the end surface 100 and the oblique surface 104 of the piston 90, causing the piston 90 to move to the right as viewed in FIG. 7.

Under the force generated by the first pyrotechnic device 320, the piston 90 moves from the first position shown in FIG. 6 toward the second position illustrated in FIG. 7. In the second position, the piston 90 is adjacent the contact block 380 in the fourth position.

As the piston 90 moves toward the second position in the housing 50, the cable 42 is pulled along with the piston. This pulling of the cable 42 causes the seat belt buckle 26, to which one end of the cable is connected, to be pulled generally downward in the direction indicated by the arrow D (FIGS. 1 and 2). The generally downward movement of the seat belt buckle 26 pulls the tongue assembly 22 downward, thereby removing slack in the seat belt webbing 16 and, if relatively little slack existed, tensioning the seat belt webbing.

If, after the first pyrotechnic device 360 is actuated, the piston 90 has moved all the way to the second position, the firing pin 372 on the second pyrotechnic drive 370 comes into contact with the projection 384 on the contact block 380. This contact actuates the second pyrotechnic device 370.

When the second pyrotechnic device 370 is actuated, the resulting combustion products of the pyrotechnic device rapidly produce a significant increase in pressure inside the fluid chamber 120 in the second portion 94 of the piston 90. The increased fluid pressure in the chamber 120 passes through the plurality of gas outlet openings 130 and increases the pressure in the chamber 56 in the housing 50. The force of the increased pressure in the chamber 56 is sufficient to overcome the frictional engagement of the contact block 380 and the inner surface 52 of the housing 50, causing the piston 90 and the block 380 to move in the direction of arrow B. The piston 90 moves toward the third position near the second end portion 60 of the housing 50. In addition, the contact block 380 is moved by the piston 90 toward the fifth position between the piston and the second end portion 60 of the housing 50.

As the piston 90 moves toward the third position in the housing 50, the cable 42 is pulled along with the piston. This pulling of the cable 42 causes the seat belt buckle 26 to be pulled farther generally downward in the direction of arrow D. This additional generally downward movement of the seat belt buckle 26 pulls the tongue assembly 22 farther generally downward, thereby further tensioning the seat belt webbing 16.

The pretensioner apparatus 300 described above provides a pretensioning force which is nearly constant for all occupants. The force generated by the first pyrotechnic device 360 takes up slack in the belt webbing 16 and, if the force is not expended in taking up the slack, tensions the belt webbing. If the piston 90 travels all the way to the second position, which is indicative that the taking-up of slack has depleted the force of the first pyrotechnic device 360, the second pyrotechnic device 370 is actuated by contact with the contact block 380. The second pyrotechnic device 370 exerts a second pretensioning force on the piston 90 to keep the piston moving and to complete the pretensioning stroke. In this way, the pretensioning force is held nearly constant for occupants of different shapes and sizes.

From the above description of the invention, those skilled in the art will perceive improvements, changes and modifications in the invention. For example, the pretensioner apparatus 40 and 300 could also be applied as a retractor-mounted system, rather than the seat belt buckle-mounted system described above. Such improvements, changes and modifications within the skill in the art are intended to be covered by the appended claims.

Having described the invention, we claim:

1. An apparatus for pretensioning seat belt webbing which is extensible about an occupant of a vehicle seat, said apparatus comprising:

a housing having first and second ends and a fluid chamber between said ends;

a piston in said housing, said piston being movable in said chamber from a first position adjacent said first end of said housing to a second position intermediate said first and second ends of said housing;

said piston having a third position adjacent said second end of said housing;

coupling means for coupling said piston to the seat belt webbing, a portion of said coupling means extending through said fluid chamber, said coupling means transmitting movement of said piston to the seat belt webbing;

a first pyrotechnic device connected with said housing and in fluid communication with said fluid chamber, said first pyrotechnic device being actuatable to cause said piston to move from said first position to said second position to tension the seat belt webbing;

a second pyrotechnic device attached to said piston, said second pyrotechnic device being actuatable to move said piston from said second position to said third position to further tension the seat belt webbing; and a contact block in said fluid chamber, said contact block having a fourth position intermediate said ends of said housing, said contact block having a fifth position adjacent said piston when said piston is in said third position, said contact block being movable from said fourth position to said fifth position by said piston.

2. An apparatus as defined in claim 1 wherein said first pyrotechnic device applies a first force to said piston to move said piston from said first position to said second position, said second pyrotechnic device applying a second force to said piston to move said piston from second position to said third position.

3. An apparatus as defined in claim 2 wherein said second pyrotechnic device is actuated by contacting said contact block, said second pyrotechnic device being moved into contact with said contact block by said first force applied to said piston.

4. An apparatus for pretensioning seat belt webbing which is extensible about an occupant of a vehicle seat, said apparatus comprising:

a housing defining a chamber;

a first piston in said chamber;

coupling means for coupling said first piston to the seat belt webbing, said coupling means transmitting force acting on said first piston to the seat belt webbing;

first means for applying a first force to said first piston to move said first piston initially in a first direction in said chamber to remove slack in the seat belt webbing; and second means for applying a second force to said first piston in said first direction to tension the seat belt webbing against the occupant after the slack has been removed from the seat belt webbing by said first force, said second means being mounted in said first piston.

5. An apparatus as defined in claim 4 wherein said first means comprises a first pyrotechnic device for increasing pressure in said chamber to cause said first piston to move in said first direction and said second means comprises a second pyrotechnic device for increasing pressure in said chamber to cause said first piston to move in said first direction.

6. An apparatus as defined in claim 5 wherein said second force is greater than said first force.

7. An apparatus as defined in claim 5 wherein said first means further comprises a second piston in said chamber and abutting said first piston.

8. An apparatus as defined in claim 5 further comprising control means operatively connected to said first and second pyrotechnic devices for controlling the actuation of said pyrotechnic devices, said control means actuating said second pyrotechnic device after actuating said first pyrotechnic device.

9. An apparatus as defined in claim 5 further comprising a contact block in said cylinder, said second pyrotechnic device being actuated by contacting said contact block, said second pyrotechnic device being moved into contact with said contact block by said first force applied to said first piston.

10. An apparatus for pretensioning seat belt webbing which is extensible about an occupant of a vehicle seat, said apparatus comprising:

a housing having first and second ends and a fluid chamber between said ends;

a first piston in said housing;

a second piston in said housing, said second piston being movable in said chamber from a first position adjacent said first end of said housing to a second position intermediate said first and second ends of said housing;

said first piston having a third position adjacent said second piston when said second piston is in said first position and a fourth position adjacent said second piston when said second piston is in said second position, said first piston being movable from said third position to said fourth position by said second piston;

said first piston further having a fifth position adjacent said second end of said housing, said first piston being spaced from said second piston when said first piston is in said fifth position;

coupling means for coupling said first piston to the seat belt webbing, a portion of said coupling means extending through said fluid chamber, said coupling means transmitting movement of said first piston to the seat belt webbing;

a first pyrotechnic device connected with said housing and in fluid communication with said fluid chamber, said first pyrotechnic device being actuatable to cause said second piston and said first piston to move from their respective first and third positions to their respective second and fourth positions to remove slack in the seat belt webbing;

a second pyrotechnic device attached to said first piston, said second pyrotechnic device being actuatable to move said first piston from said fourth position to said fifth position to tension the seat belt webbing; and control means operatively connected to said first and second pyrotechnic devices for controlling the actuation of said pyrotechnic devices, said control means actuating said second pyrotechnic device after actuating said first pyrotechnic device.

11. An apparatus as defined in claim 10 wherein said first pyrotechnic device applies a first force to said first and second pistons to move said pistons, said second pyrotechnic device applying a second force to said first piston to move said first piston.

12. An apparatus as defined in claim 11 wherein said second pyrotechnic device has a higher gas output than said first pyrotechnic device, thereby causing said second force to be larger than said first force.

13. An apparatus for pretensioning seat belt webbing which is extensible about an occupant of a vehicle seat, said apparatus comprising:

a housing having first and second ends and a fluid chamber between said ends;

a piston in said housing, said piston being movable in said chamber from a first position adjacent said first end of said housing to a second position intermediate said first and second ends of said housing;

said piston having a third position adjacent said second end of said housing;

coupling means for coupling said piston to the seat belt webbing, a portion of said coupling means extending through said fluid chamber, said coupling means transmitting movement of said piston to the seat belt webbing;

a first pyrotechnic device connected with said housing and in fluid communication with said fluid chamber, said first pyrotechnic device being actuatable to cause said piston to move from said first position to said second position to tension the seat belt webbing; and a second pyrotechnic device attached to said piston, said second pyrotechnic device being actuatable to move said piston from said second position to said third position to further tension the seat belt webbing.

14. An apparatus for pretensioning seat belt webbing which is extensible about an occupant of a vehicle seat, said apparatus comprising:

a housing defining a chamber;

a first piston in said chamber;

coupling means for coupling said first piston to the seat belt webbing, said coupling means transmitting force acting on said first piston to the seat belt webbing;

first means for applying a first force to said first piston to move said first piston initially in a first direction in said chamber to remove slack in the seat belt webbing;

second means for applying a second force to said first piston in said first direction to tension the seat belt webbing against the occupant after the slack has been removed from the seat belt webbing by said first force, said first means comprising a first pyrotechnic device connected with said housing, said first pyrotechnic device for increasing pressure in said chamber acting on said first piston in said first direction, said second means comprising a second pyrotechnic device connected with said first piston, said second pyrotechnic device for increasing pressure in said chamber to cause said first piston to move in said first direction; and a contact block in said cylinder, said second pyrotechnic device being actuated by contacting said contact block, said second pyrotechnic device being moved into contact with said contact block by said first force applied to said first piston.

15. An apparatus for pretensioning seat belt webbing which is extensible about an occupant of a vehicle seat, said apparatus comprising:

a housing defining a chamber;

a first piston in said chamber;

coupling means for coupling said first piston to the seat belt webbing, said coupling means transmitting force acting on said first piston to the seat belt webbing;

first means for applying a first force to said first piston to move said first piston initially in a first direction in said chamber to remove slack in the seat belt webbing; and second means for applying a second force to said first piston in said first direction to tension the seat belt webbing against the occupant after the slack has been removed from the seat belt webbing by said first force, said second force being greater than said first force, said first means comprising a second piston in said chamber and abutting said first piston and a first pyrotechnic device for increasing pressure in said chamber acting on said second piston to effect movement of said first and second pistons in said chamber.

16. An apparatus as defined in claim 15 wherein said second means comprises a second pyrotechnic device for increasing pressure in said chamber acting on said first piston in said first direction, said second pyrotechnic device having a larger output than said first pyrotechnic device.

17. An apparatus as defined in claim 16 further comprising control means operatively connected to said first and second pyrotechnic devices for controlling the actuation of said pyrotechnic devices, said control means actuating said second pyrotechnic device after actuating said first pyrotechnic device.

* * * * *